United States Patent [19]
Walzer, Jr.

[11] Patent Number: 5,643,847
[45] Date of Patent: Jul. 1, 1997

[54] SUPPORTED IONIC CATALYST COMPOSITION

[75] Inventor: John Flexer Walzer, Jr., Seabrook, Tex.

[73] Assignee: Exxon Chemical Patents Inc., Wilmington, Del.

[21] Appl. No.: 474,948

[22] Filed: Jun. 7, 1995

Related U.S. Application Data

[63] Continuation-in-part of Ser. No. 285,380, Aug. 3, 1994, abandoned.

[51] Int. Cl.$^6$ .................................................. C08F 4/64
[52] U.S. Cl. .................. 502/117; 502/120; 502/152; 502/155; 526/160; 526/901; 526/943; 526/352; 526/351; 526/348.2
[58] Field of Search ................................ 502/152, 120, 502/117; 526/160, 351, 352, 348.2, 901, 943

[56] References Cited

U.S. PATENT DOCUMENTS

| | | | |
|---|---|---|---|
| 5,001,205 | 3/1991 | Hoel. | |
| 5,057,475 | 10/1991 | Canich | 502/104 |
| 5,198,401 | 3/1993 | Turner et al. . | |
| 5,206,197 | 4/1993 | Campell, Jr. . | |
| 5,288,677 | 2/1994 | Chung et al. | 502/152 |
| 5,308,816 | 5/1994 | Tsutsui et al. | 502/108 |
| 5,428,120 | 6/1995 | Newman et al. | 526/160 |
| 5,444,134 | 8/1995 | Matsumoto | 526/159 |
| 5,453,410 | 9/1995 | Kolthammer et al | 502/155 |

FOREIGN PATENT DOCUMENTS

| | | |
|---|---|---|
| 0 427 697 A2 | 9/1990 | European Pat. Off. . |
| 0 520 732 A1 | 6/1992 | European Pat. Off. . |
| 91/09882 | 7/1991 | WIPO . |
| WO-A-93/11172 | 6/1993 | WIPO . |
| WO93/19103 | 9/1993 | WIPO . |
| WO-A-94/00500 | 1/1994 | WIPO . |
| 94/03506 | 2/1994 | WIPO . |
| WO-A-94/07928 | 4/1994 | WIPO . |
| WO95/15815 | 12/1994 | WIPO . |

OTHER PUBLICATIONS

"Olefin Copolymerization with Metallocene Catalysts. III Supported Metallocene/Methylaluminoxane Catalyst for Olefin Copolymerization" pp. 1603–1607: J. Polym. Sci., A, Polym Chem, vol. 29,1991.

Yang et al. "Cation–like" Homogeneous Olefin Polymerization Catalysts Based upon Zirconocene alkyls and Tris(pentafluorophenyl)borane, J. Am. Chem. Soc. 1991,113, pp. 3623–3625 1991.

Quyoum et al. "$\eta$–C5TiMe3B(C6F5)3: A Carbocationic Olefin Polymerization Initiator Masquerading as a Ziegler–Natta Catalyst" *J. Am. Chem. Soc.* 1994, 116, 6435–6436.

M.P. McDaniel "Supported Chromium Catalysts for Ethylene Polymerization" *Advances in Catalysis*, vol. 33, pp. 47–97 (1985).

Primary Examiner—David W. Wu
Attorney, Agent, or Firm—W. G. Muller

[57] ABSTRACT

The invention is directed to a catalyst composition suitable for addition reactions of ethylenically and acetylenically unsaturated monomers comprising a metal oxide support having covalently bound to the surface thereof directly through the oxygen atom of the metal oxide an activator anion that is also ionically bound to a catalytically active transition metal cation compound. The invention includes a preparation process for the invention catalyst composition exemplified by reacting a Lewis acid, such as trisperfluorophenyl boron with residual silanol groups of a silica support, preferably then reacting with a Lewis base such as diethylaniline, so as to prepare a silica bound anionic activator that when combined with a suitable transition metal compound will protonate it so as to form the ionic catalyst system. Use of the invention catalyst to polymerize alpha-olefins is exemplified.

21 Claims, No Drawings

SUPPORTED IONIC CATALYST COMPOSITION

This application is a continuation-in-part of U.S. application Ser. No. 08/285,380, filed Aug. 3, 1994 now abandoned.

TECHNICAL FIELD

This invention relates to catalyst compositions useful for addition reactions of olefinically unsaturated monomers, e.g., polymerization. The invention is particularly useful in coordination polymerization processes that utilize supported compounds such as for slurry or gas phase polymerization of olefinically unsaturated monomers, and those processes themselves. The catalyst compositions comprise metallocene cation catalysts, anionic activators and metal oxide supports.

BACKGROUND OF THE INVENTION

Coordination polymerization of olefinically unsaturated monomers is well known and has led to the great proliferation in modern society of elastomeric and plastic compositions of matter, such as polyethylene, polypropylene, and ethylene propylene rubber. Early pioneers utilized transition metal compounds with such activators as aluminum alkyls and later development extended this work to bulky ligand-containing (e.g., $\eta^5$-cyclopentadienyl) transition metals ("metallocenes") with activators such as alkyl alumoxanes. The most recent developments have shown the effectiveness of ionic catalysts comprised of metallocene cations activated by non-coordinating anions, see for example EP-A-277,004 and U.S. Pat. No. 5,198,401, both of which are incorporated by reference for purposes of U.S. patent practice. These references describe protonation of metallocene compounds by anion precursors to form stable ionic catalysts.

The ionic catalysts of the prior art have shown to varying degrees significant sensitivity to catalyst poisons present in monomer feed streams or in recycled fluid streams in the polymerization process and have posed problems for use with inert oxide supports that typically have either or both of retained moisture or polar hydroxyl groups. Accordingly processes have been developed to utilize poison scavenging compounds, for example alkyl aluminiums or alumoxanes, for solution polymerization and to remove or neutralize polar groups retained in or on metal oxide supports. See, for example, U.S. Pat. No. 5,153,157, describing Group-IIIA metal scavenger compounds, and WO-A-91/09882, WO-A-94/00500 and WO-A-94/03506 describing supporting techniques utilizing similar compounds. U.S. Pat. No. 5,206,197 describes enhanced polymerization of styrene where the ionic catalyst systems include a metal hydrocarbyl, and, which may be supported. All documents are incorporated by reference for description of metallocene compounds, ionic activators and useful scavenging compounds, as is counterpart U.S. Ser. No. 07/957,305, filed Oct. 5, 1992, for purposes of U.S. patent practice.

Supported catalysts based on the reaction of chromocenes with metal (M) oxides, suggested to yield a chromate or dichromate structure, —Cr(—O—M—)$_2$ or (—M—O—Cr—)(O)(—Cr—O—M—), are also a well-known class of supported metallocene catalysts found to be useful particularly for linear polyethylene by any of solution, slurry or gas phase commercial processes. See, for example, "Supported Chromium Catalysts for Ethylene Polymerization", McDaniel, *Advances in Catalysis* 1985, 33, 47–97. Silica is a less preferred support due to a lower reactivity than, for example, aluminum phosphate, typically no other activator is required, and the metal center of the metallocene is covalently bound through the oxo-linkage (—O—) to the support metal/metalloid.

Additionally, co-pending U.S. Set. No. 031,004 and equivalent WO-A-93/11172, incorporated by reference for purposes of U.S. patent practice, describe the chemical bonding of non-coordinating anionic activators to supports so as to prepare polyanionic activators that when used with the metallocene compounds avoid problems of catalyst desorption experienced when ionic catalysts physically adsorbed on metal oxide supports are utilized in solution or slurry polymerization. The supports are core components of inert monomeric, oligomeric, polymeric or metal oxide supports which have been prepared so as to incorporate chemically bound non-coordinating anions. The teaching of the preparation of polyanionic activators from metal oxides (FIG. 8) entails the reaction of a hydoxylated silica surface with silane coupling agents at least some of which contain halolaryl moieties which can be lithiated to form chemically bound arylithium groups. These are subsequently treated with the bulky metalloid precursor trisperfluorophenylboron (B(pfp)$_3$) and subjected to an ion exchange reaction with dimethylanilinium hydrochloride ([DMAH]$^+$[Cl]$^-$) so as to prepare a silica surface having covalently linked activator groups of [DMAH]$^+$[(pfp)$_3$B]$^-$. The examples illustrate the bulk polymerization of polypropylene using hydrocarbyl support based polyionic catalyst systems in batch autoclave reactors.

There is a need to address further both the preparation of ionic catalyst systems on supports and a need to find supported catalysts that are not subject to problems in the polymerization process leading to reactor instability from over production, fouling of polymerization equipment surfaces, and unwanted preparation of polymer particles of poor morphology not suited to efficient polymer production on an industrial scale.

INVENTION DISCLOSURE

This invention is directed to solving the needs expressed above, and others as discussed below, and is a transition metal catalyst composition characterized by comprising a metal oxide support having covalently bound to the surface thereof directly through the oxygen atom of the metal oxide an activator anion that is also ionically bound to a catalytically active transition metal cation compound. Additionally the invention includes a polymerization process characterized by comprising contacting one or more monomers polymerizable by coordination or carbocationic polymerization under conventionally suitable polymerization conditions with the invention catalyst composition. The invention includes a preparation process for the invention catalyst composition typically comprising reacting a Lewis acid bulky catalyst anion source with hydroxyl groups of the support, preferably in the presence of a Lewis base, so as to prepare a support bound anionic activator that when combined with a suitable transition metal compound will protonate it so as to form the ionic catalyst system comprising the transition metal cation and the support bound anion.

BEST MODE AND EXAMPLES OF THE INVENTION

The invention catalyst composition described above can be generically represented by the chemical formula $$[L_nL'_mM'R'T]^+[LA—O—M''—]^-, \qquad (1)$$

where $[L_nL'_mM'R']^+$ is the catalytically active transition metal cation and $[LA-O-M''-]^-$ is metal oxide support bound activator anion. More specifically, $L_n$ is one or more ligands (n equals $d^0-1$ where $d^0$ is the highest oxidation state of M') covalently bound to M', $L'_m$ is a neutral, non-oxidizing ligand having a dative bond to M' (typically m equals 0 to 3), M' is a Group 4, 5, 6, 9, or 10 transition metal, R' is a ligand having a σ bond to M' into which a polymerizable monomer or macromonomer can insert for coordination polymerization. LA is a Lewis acid that is capable of forming the anionic activator, O is oxygen, and M''— is the metal/metalloid of the metal oxide support.

The metal oxide supports of the invention include any metal/metalloid oxides having surface hydroxyl groups exhibiting a $pK_a$ equal to or less than that observed for amorphous silica, i.e., $pK_a$ less than or equal to about 11. In forming the invention covalently bound anionic activator by a preferred method LA is selected so as to be capable of forming a dative complex with a silanol group (which acts as a Lewis base) thus forming a formally dipolar (zwitterionic) Bronsted acid structure bound to the metal/metalloid of the metal oxide support. Accordingly any of the conventionally known silica support materials that retain hydroxyl groups after dehydration treatment methods will be suitable in accordance with the invention. Because of availability, both of silica and silica containing metal oxide based supports, for example, silica-alumina, are preferred. Silica particles, gels and glass beads are most typical.

These metal oxide compositions may additionally contain oxides of other metals, such as those of Al, K, Mg, Na, Si, Ti and Zr and should preferably be treated by thermal and/or chemical means to remove water and free oxygen. Typically such treatment is in a vacuum in a heated oven, in a heated fluidized bed or with dehydrating agents such as organo silanes, siloxanes, alkyl aluminum compounds, etc. The level of treatment should be such that as much retained moisture and oxygen as is possible is removed, but that a chemically significant amount of hydroxyl functionality is retained. Thus calcining at up to 800° C., or more up to a point prior to decomposition of the support material, for several hours is permissible, and if higher loading of supported anionic activator is desired, lower calcining temperatures for lesser times will be suitable. Where the metal oxide is silica, loadings to achieve from less than 0.1 mmol to 3.0 mmol activator/g $SiO_2$ are typically suitable and can be achieved, for example, by varying the temperature of calcining from 200° to 800° C. See Zhuralev, et al, Langmuir 1987, vol. 3, 316 where correlation between calcining temperature and times and hydroxyl contents of silicas of varying surface areas is described.

The tailoring of hydroxyl groups available as attachment sites in this invention can also be accomplished by the pre-treatment, prior to addition of LA, with a less than stoichimetric amount of the chemical dehydrating agents. Preferably those used will be used sparingly and will be those having a single ligand reactive with the silanol groups (e.g., $(CH_3)_4SiCl$), or otherwise hydrolyzable, so as to minimize interference with the reaction of the transition metal catalyst compounds with the bound activator. If calcining temperatures below 400° C. are employed, difunctional coupling agents (e.g., $(CH_3)_3SiCl_2$) may be employed to cap hydrogen bonded pairs of silanol groups which are present under the less severe calcining conditions. See, e.g., "Investigation of Quantitative SiOH Determination by the Siliane Treatment of Disperse Silica", Gotski, et al, Journ. of Colloid and Interface Science, Vol. 126, No. 2, December 1988, for discussion of the effect of silane coupling agents for silica polymeric fillers that will also be effective for modification of silanol groups on the catalyst supports of this invention. Similarly, use of LA in excess of the stoichimetric amount needed for reaction with the transition metal compounds will serve to neutralize excess silanol groups without significant detrimental effect for catalyst preparation or subsequent polymerization.

The activator anion neutral precursors that serve as the Lewis acid (LA) of the invention include any of the non-coordinating anion precursors of sufficient acidity to accept the available electron pair of the hydroxyl group oxygen atom and facilitate the protonation of the transition metal compound or a secondary proton acceptor, see below, by the silanol group proton. The preferred activator anion neutral precursors that serve as the Lewis acid (LA) of the invention are strong Lewis acids with non-hydrolyzable ligands, at least one of which is electron-withdrawing, such as those Lewis acids known to abstract an anionic fragment from dimethyl zirconocene (biscyclopentedienyl zirconium dimethyl) e.g., tris perfluorophenyl boron. These precursors therefore should not possess any reactive ligands which can be protonated by the hydroxyl groups of the metal oxide (the silanol group proton). For example, any Group 13 element based Lewis acids having only alkyl, halo, alkoxy, and/or amido ligands, which are readily hydrolyzed in aqueous media, are not suitable. At least one ligand of LA must be sufficiently electron-withdrawing to achieve the needed acidity, for example, trisperfluorophenyl boron. Typical metal/metalloid centers for LA will include boron, aluminum, antimony, arsenic, phosphorous and gallium. Most preferably LA is a neutral compound comprising a Group 13 metalloid center with a complement of ligands together sufficiently electron-withdrawing such that the Lewis acidity is greater than or equal to that of $AlCl_3$. Examples include trisperfluorophenylboron, tris(3,5-di (trifluoromethyl)phenyl)boron, tris(di-t-butylmethylsilyl) perfluorophenylboron, and other highly fluorinated trisaryl-boron compounds.

Additionally, likely because of the sterically limiting presence of the surface of the support in addition to the sterically limiting stabilizing ligands (those not abstracted or replaced by a proton or alkyl group during protonation or alkylation) of the catalytically active transition metal compounds, the invention activator anions will include anions capable of coordination to the transition metal under conventional solution ionic reaction conditions while remaining labile. The term "labile" is an art recognized term meaning that under polymerization conditions the anion is only loosely coordinated at the site of catalyst activity so as to permit displacement by a polymerizable monomer at the point of monomer addition. Examples of Lewis acid precursors of typical coordinating anions of this invention include the bulky aluminum siloxides such as $Al(OSi(C_6H_5)_3)_3$, or $Al(OSi(O-t-butyl)_3)_3$ which can be generically represented as $Al(O(SiR''')_3)_3$ or $Al(OSi(O-R''')_3)_3$ where each R''' is the same or different bulky $C_4$ and higher carbon number substituent such as tert-butyl or higher MW branched aliphatic, aromatic, aliphatic substituted aromatic, etc.

Any catalytically active transition metal compound is suitable in accordance with the invention, including the known transition metal compounds useful in traditional Ziegler-Natta coordination polymerization and as well the metallocene compounds similarly known to be useful in coordination polymerization, when such compounds are capable of catalytic activation by the support bound anionic activator. These will typically include transition metal compounds where the metal is in a $d^0$ oxidation state, that is where the metal has its highest oxidation number, and wherein at least one metal ligand can be protonated by the support bound anionic activator, particularly those ligands including hydride, alkyl and silyl. Ligands capable of protonation and transition metal compounds comprising them include those described in the background art, see for example EP-A-277,003, EP-A-277,004 and U.S. Pat. No. 5,198,401. Syntheses of these compounds is well known from the published literature. Additionally, where the metal ligands include halogen moieties (for example, biscyclopentadienyl zirconium dichloride) which are not capable of protonation under standard conditions, they can be converted via known alkylation reactions with organometallic compounds such as lithium or aluminum hydrides or alkyls, alkylalumoxanes, Grignard reagents, etc. See also EP-A1-0 570 982 for the reaction of organoaluminum compounds with dihalo-substituted metallocene compounds prior to addition of activating anion compounds. All documents are incorporated by reference for purposes of U.S. patent practice.

Additional description of metallocene compounds which comprise, or can be alkylated to comprise, at least one ligand capable of abstraction via protonation to form a transition metal cation appear in the patent literature, for example EP-A-0 129 368, U.S. Pat. Nos. 4,871,705, 4,937,299, 5,324,800 EP-A-0-418 044, EP-A-0 591 756, WO-A-92/00333 and WO-A-94/01471. All documents are incorporated by reference for purposes of U.S. patent practice. Such metallocene compounds can be described for this invention as mono-, bis-, or tris-cylopentadienyl substituted Group 4, 5, 6, 9, or 10 transition metal compounds wherein the cyclopentadienyl substituents may be themselves substituted with one or more groups and may be bridged to each other, or may be bridged through a heteroatom to the transition metal. The size and constituency of the cyclopentadienyl substituents and bridging elements are not critical to the preparation of the ionic catalyst systems of the invention but should be selected in the literature described manner to enhance the polymerization activity and polymer characteristics being sought. Preferably the cyclopentadienyl (or substituted cyclopentadienyl, such as indenyl or substituted indenyl) rings, when bridged to each other, will be lower alkyl-substituted ($C_1$-$C_6$) in the 2 position and will additionally comprise alkyl, cycloalkyl, aryl, alkylaryl and or arylalkyl substituents, the latter as either of fused or pendant ring structures including multi-ring structures, for example, those of U.S. Pat. Nos. 5,278,264 and 5,304,614. Such substituents should each have essentially hydrocarbyl characteristics and will typically contain up to 30 carbon atoms but may be hetero-atom containing with not more than 1–3 non-hydrogen/carbon atoms, e.g., N, S, O, P, and Si.

Metallocene compounds suitable for the preparation of linear polyethylene or ethylene-containing copolymers (where copolymer means comprising at least two different monomers) are essentially any of those known in the art, see again EP-A-277,004, WO-A-92/00333 and U.S. Pat. Nos. 5,198,401, 5,001,205, 5,324,800, 5,308,816, and 5,304,614 for specific listings. Selection of metallocene compounds for use to make isotactic or syndiotactic polypropylene, and their syntheses, are well-known in the art, specific reference may be made to both patent literature and academic, see for example Journal of Organmetallic Chemistry 369, 359–370 (1989). Typically those catalysts are stereorigid asymmetric, chiral or bridged chiral metallocenes. See, for example, U.S. Pat. No. 4,892,851, U.S. Pat. No. 5,017,714, U.S. Pat. No. 5,296,434, U.S. Pat. No. 5,278,264, WO-A-(PCT/U.S.92/10066) WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al, *Organometallics* 1994, 13, 954–963, and "ansa-Zirconocene Polymerization Catalysts with Annelated Ring Ligands-Effects on Catalytic Activity and Polymer Chain Lengths", Brinzinger, H., et al, *Organometallics* 1994, 13, 964–970, and documents referred to therein. Though many above are directed to catalyst systems with alumoxane activators, the analogous metallocene compounds will be useful with the supported activator anions of this invention for active coordination catalyst systems, when at least one of the halogen containing ligands of the metals (where occurring) are replaced with ligands capable of protonation, for example, via an alkylation reaction as described above, and another is a group into which the ethene group —C=C— may insert, for example, hydride, alkyl, or even the less effective silyl. All documents are incorporated by reference for purposes of U.S. patent practice.

Non-limiting representative metallocene compounds include monocyclopentadienyl compounds such as pentamethylcyclopentadienyltitanium isopropoxide, pentamethylcyclopentadienyltribenzyl titanium, dimethylsilyltetramethylcyclopentadienyl-tert-butylamido titanium dichloride, pentamethylcyclopentadienyl titanium trimethyl, dimethylsilyltetramethylcyclopentadienyl-tert-butylamido zirconium dimethyl, dimethylsilyltetramethylcyclopentadienyl-dodecylamido hafnium dihydride, dimethylsilyltetramethylcyclopentadienyl-dodecylamido hafnium dimethyl, unbridged biscyclopentadienyl compounds such as bis(1,3-butyl, methylcyclopentadienyl) zirconium dimethyl, pentamethylcyclopentadienyl-cyclopentadienyl zirconium dimethyl; bridged biscyclopentadienyl compounds such as dimethylsilylbis(tetrahydroindenyl) zirconium dichloride; bridged bisindenyl compounds such as dimethylsilylbisindenyl zirconium dichloride, dimethylsilylbisindenyl hafnium dimethyl, dimethylsilylbis(2-methylbenzindenyl) zirconium dichloride, dimethylsilylbis(2-methylbenzindenyl) zirconium dimethyl; and the additional mono-, bis-, and triscyclopentadienyl compounds such as those listed and described in U.S. Pat. No. 5,324,800 and EP-A-0 591 756.

Representative traditional Ziegler-Natta transition metal compounds include tetrabenzyl zirconium, tetra bis (trimethylsiylmethyl) zirconium, oxotris (trimethlsilylmethyl) vanadium, tetrabenzyl hafnium, tetrabenzyl titanium, bis(hexamethyl disilazido)dimethyl titanium, tris(trimethyl silyl methyl) niobium dichloride, tris(trimethylsilylmethyl) tantalum dichloride. The important features of such compositions for coordination polymerization are the ligand capable of abstraction by protonation and that ligand into which the ethene (olefinic) group can be inserted. These features enable the protonation of the transition metal compound and the concomitant formation of the ionic catalyst composition of the invention.

The supported ionic catalyst composition of the invention can be prepared, for example, by selecting as the Lewis acid which forms the Lewis acid-base complex, one that is capable of serving as a suitable counter anion upon protonation of the transition metal compound with the proton from Lewis acid-base hydroxyl group complex. This reaction sequence can be represented by the following chemical reaction equations

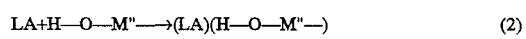

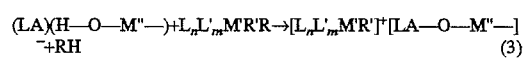

where the symbols $L_n$, $L'_m$, M', R', LA, O, and M" are as defined for (1) above, H is hydrogen, and R a ligand capable of abstraction by protonation. The reaction is typically run in a hydrocarbyl solution (heptane, toluene, etc.) at ambient temperature and pressure and the supported catalyst can be separated, for example, by filtration.

A preferred embodiment of the preparation process is to add additionally a secondary proton acceptor (LB) to facilitate the reactions of Eq. (2) and (3). This reaction can be represented in the following chemical reaction equations

  (3a)

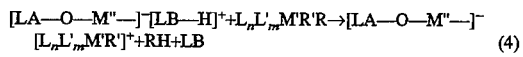  (4)

where all symbols are as defined above. The reaction can be run essentially as described above. LB is a Bronsted base, such as diethylaniline which forms an ammonium salt with the supported anionic activator [LA—O—M"—]$^-$, as in (3a). Other examples of LB include dimethylaniline, diphenylmethylamine, tributylamine, diphenylmethylamine, triphenylphosphine, and trimethyl phosphite.

The product of reaction (3a) is clearly covalently bound and thus distinctly different in composition from physically supported (i.e., adsorbed) ionic species such as those described in WO 91/09882. This is strongly suggested by the observation that active catalysts are obtained even after several washings with solvents likely to remove the individual components LA, and LB, and definitively demonstrated by solid state NMR results. Specifically, the presence of the preferred linkage structure in the products of reactions (3a) and (4) and the structural distinction between the product of reaction (4) and a physically adsorbed species (vide supra) have been shown by solid state Magic Angle Spinning $^{11}$B NMR spectroscopy. See comparison example 24 below.

The $^{11}$B spectrum of the invention catalyst consisted of a single peak at −6.6 ppm, whereas the 11B spectrum of the catalyst prepared according to the teachings in example 14 of WO 91/09882 was characterized by a single peak at −17 ppm. This difference in $^{11}$B chemical shift is consistent with the difference between an ionic species containing a covalent linkage to the support and a physically supported ionic species, in accordance with principles known to those skilled in the art, and as delineated by Kidd, R. G. in NMR of Newly Accessible Nuclei; Laszlo, P., Ed.; Academic Press: New York, 1983; Vol;. 2, pp 49–77. Therefore, the catalyst invention species prepared according to the teachings of this patent are distinct from those catalysts claimed in WO 91/09882.

Several constraints must be placed on LB if the catalyst invention is to result in an active catalyst: (a) LB must be a strong enough Bronsted base to abstract a proton as shown in (3a), (b) LB cannot be so strong a Bronsted base so that its conjugate acid would be unable to protonate the transition metal compounds of the invention, thus its $pK_pH^+$ must be less than that of RH, (c) the [LA—O—M"—]$^-$ [LB—H]$^+$ complex must have a kinetically accessible proton and (d) LB must be a sufficiently poor Lewis base (and/or possess sufficient steric bulk) that it does not compete effectively with polymerizable monomer for the vacant coordination site at the cationic metal center. It should be noted that condition (a) is to some extent dependent on the Lewis acidity of LA, since this determines the Bronsted acidity of the (LA)(H—O—M"—) complex. Examples of potential LB's which do not lead to active catalysts are: perfluoro (tributyl)amine (not a strong enough Bronsted base), "proton sponge" 1,9-N,N,N,N-tetramethyl-1,8-naphthalene diamine (protonated form does not react with $L_nL'_mM'R'R$), and quinoline (good Lewis base which coordinates to the metal center, M').

These methods of preparation result in a number of reaction products. The reaction of LA, with LB, results in high yields (>95%) of an intermediate reaction product that is an immobilized activator precursor composition having essentially all of the activator anion precursor species covalently bound to the metal oxide support. Subsequent reaction with any of the described metallocene compounds results in a similar percentage of immobilized transition metal catalyst composition. To assure such purity it will be apparent to those skilled in the art that sufficient washing(s) after each reaction may be appropriate to remove LA, LB or transition metal compositions that have not reacted to form the preferred linkage structure.

In order to improve or facilitate either reaction the selection of R can be such that RH is a gas that can be readily separated from the reaction solvent. Thus where R is —H or (—CH$_3$, protonation results in hydrogen or methane gas respectively under both methods of preparation.

This catalyst invention is useful in coordination polymerization of unsaturated monomers conventionally known to be polymerizable under coordination polymerization conditions. Such conditions also are well known and include solution polymerization, slurry polymerization, and low pressure gas phase polymerization. The supported catalysts of the invention are thus particularly useful in the known operating modes employing fixed-bed, moving-bed, fluid-bed, or slurry processes conducted in single, series or parallel reactors.

Linear polyethylene, including high and ultra-high molecular weight polyethylenes, including both homo- and copolymers with other alpha-olefin monomers, alpha-olefinic and/or non-conjugated diolefins, for example, $C_3$–$C_{20}$ olefins/diolefins, are produced by adding ethylene, and optionally the other monomers, to a reaction vessel under low pressure (typically <50 bar), at a typical temperature of 20°–250° C. with the invention catalyst that has been slurried with a solvent, such as heptane or toluene. Heat of polymerization is typically removed by cooling. Polymer forms as granules that are usually insoluble in the reaction diluent. Termination of polymerization generally occurs via beta hydride elimination resulting in terminal olefinic unsaturation or by the addition of a chain transfer agent such as hydrogen or aluminum alkyl resulting in chain end saturation. The polymer may be filtered or centrifuged off, washed, and dried, i.e., for slurry reactions. As indicated, chain transfer agents should be avoided if chain end unsaturation is to be retained. Gas phase polymerization can be conducted, for example, in a continuous fluid bed gas-phase reactor operated at 2000–3000 kPa and 60°–160° C., using hydrogen as a reaction modifier (100–200 ppm), $C_4$–$C_8$ comonomer feedstream (0.5–1.2 mol %), and $C_2$ feedstream (25–35 mol %). See, U.S. Pat. Nos. 4,543,399, 4,588,790, 5,028,670 and co-pending U.S. application Ser. No. 08/053, 067 filed Apr. 26, 1993, which are incorporated by reference for purposes of U.S. patent practice.

Polypropylene typically can be prepared essentially as described for linear polyethylene above. The reaction diluent is often comprised of liquid propylene monomer in which the supported ionic catalyst is slurried. Other monomers, typically the lower alpha-olefins (e.g., $C_2$–$C_{10}$) and/or non-conjugated diolefins, can be introduced into the reaction diluent or solvent when either of polyethylene or polypropylene copolymers are to be prepared. The polymerization reactions for all of linear polyethylene, polypropylene and polyolefin polymers may be conducted in any suitable reactor, for example, in batch, continuous flow, parallel or series reactors.

Ethylene-α-olefin(-diolefin) elastomers of high molecular weight and low crystallinity can be prepared utilizing the catalysts of the invention by introducing ethylene gas into a slurry utilizing the α-olefin or mixture thereof with other monomers, polymerizable and not, as a polymerization diluent in which the invention catalyst is suspended. Typical ethylene pressures will be between 10 and 1000 psig (69–6895 kPa) and the polymerization diluent temperature will typically be between –10°–100° C. The process can be carried out in a stirred tank reactor, or more than one operated in series or parallel. Deashing can be accomplished in accordance with conventional knowledge in the art, or if to be avoided a process using one or more fixed bed or packed column reactors (see below) may be used. See the general disclosure of U.S. Pat. No. 5,001,205 for general process conditions and selection of preferred transition metal compounds, which if having halide ligands on the transition metal preferably should be alkylated as discussed above for utility with the ionic catalyst compositions of the invention.

Pre-polymerization of the supported catalyst of the invention may also be used for further control of polymer particle morphology in typical slurry or gas phase reaction processes in accordance with conventional teachings. For example such can be accomplished by pre-polymerizing a $C_2$–$C_6$ alpha-olefin for a limited time, for example, ethylene is contacted with the supported catalyst at a temperature of –15° to 30° C. and ethylene pressure of up to about 250 psig (1724 kPa) for 75 min. to obtain a polymeric coating on the support of polyethylene of 30,000–150,000 molecular weight. The pre-polymerized catalyst is then available for use in the polymerization processes referred to above. In a similar manner, the activated catalyst on a support coated with a previously polymerized thermoplastic polymer can be utilized in these polymerization processes.

Additionally it is preferred to avoid the effect of polymerization poisons that may be introduced via feedstreams, solvents or diluents, by removing or neutralizing the poisons. For example, monomer feed streams or the reaction diluent may be pre-treated, or treated in situ during the polymerization reaction, with a suitable scavenging agent. Typically such will be an organometallic compound employed in processes such as those using the Group-13 organometallic compounds of 5,153,157 and WO-A-91/09882 and WO-A-94/03506, noted above, and that of WO-A-93/14132. Preferably the amount of scavenging agent is minimized, or avoided altogether, during polymerization reactions when it is desired to retain terminal unsaturation since they tend to act as chain transfer agents resulting in terminal saturation.

Other olefinically unsaturated monomers besides those specifically described above may be polymerized using the catalyst according to the invention either by coordination or carbocationic polymerization, for example, styrene, alkyl-substituted styrene, ethylidene norbornene, norbornadiene, dicylopentadiene, cyclopene, and other alpha olefinic unsaturated and strained geometry olefins, isobutylene, isoprene, butadiene, vinyl ethers, vinyl carbazoles, etc. Additionally because of the ability of the catalytically active transition metal based catalysts of the invention to incorporate higher alpha-olefin monomers, alpha-olefinic macromonomers of up to 100 mer units, or more, may also be incorporated by copolymerization. The resulting polymers may be homopolymers or copolymers of more than one monomer, and may be of any of the recognized tacticity forms depending upon the selection of metallocene cation precursor and monomer in accordance with conventional knowledge in the art. See for example U.S. Pat. Nos. 5,066,741 and 5,206,197, which address the preparation of syndiotactic vinyl aromatic polymers with single $\eta^5$-cyclopentadienyl metallocene compounds activated by non-coordinating, compatible anions; and, U.S. Pat. Nos. 5,278,265 and 5,304,523 addressing preparation of isotactic and syndiotactic polypropylene under low temperature conditions using stereorigid metallocenes with non-coordinating anions. Each is incorporated for purposes of U.S. patent practice.

Important industrial benefits of the invention arise from the specific structures described. Because the hydroxyl groups are fixed uniformly on the metal oxide surface due in turn to the spacing between adjacent metal oxide molecules, the catalyst will be uniformly distributed on that surface. Accordingly polymerization occurs uniformly at all surfaces (externally and inside the pores) and potential difficulties with "hot spots", where excessive polymerization leads to local overheating, is avoided. Pre-mature catalyst fragmentation can thus be avoided and the production of fines traditionally faced with highly active catalysts and the non-uniform adsorption of catalysts on the supports can be minimized. Additionally, desorbtion due to fluid flow of solvent, diluent or monomer is essentially eliminated so polymerization is retained at the support, and not transferred to the walls of reactors, pipes, etc., so as to lead to fouling and downtimes for cleaning. This fixed support system also allows for the easy production of hydrocarbon soluble polymers having essentially no residual catalyst, or ash, using metal oxide fixed bed equipment since the monomer can be fed and the polymer removed in solvent without introduction into the solvent of catalyst due to removal of the catalyst from the fixed bed.

The alpha-olefin based polymers produced with invention catalyst system have utility according to molecular weight, level of comonomer incorporation, where included, and polydispersity ("MWD"), etc. for their conventional and known uses. Thus films, fibers, and moldable thermoplastics by any of the known means of melt processing and subsequent extrusion, and/or, thermoforming are typical applications. In such, inclusion of additives such as processing aids, stabilizers, pigments, fillers as conventionally known can be utilized. High density polyethylene and isotactic polypropylene films, including those that are oriented in one or both axes and those modified with other components such as hydrocarbon tackifier resins are specific examples.

Further, inclusion of other thermoplastic components both in greater and lower amounts will be useful as known for various polymer blends and compositions. Thus the use of elastomeric polyolefins of the invention for impact modification of polar engineering resins or in co-vulcanizable elastomer blends (typically when containing diolefin comonomer and/or further derivatized as by free-radical grafting of polar monomers) is suitable. For a preferred derivatization process see WO-A-93/12148 based upon co-pending application U.S. Ser. No. 07/989,289 filed Nov. 12, 1992, which is incorporated by reference for purposes of U.S. patent practice.

Lubricating oil additive compositions can be prepared advantageously when low molecular weight alpha-olefin copolymers having vinylidene terminal unsaturation are prepared with the supported catalysts of the invention. For example, low molecular weight ethylene-propylene or ethylene-butene can be prepared under slurry coordination conditions at typical temperatures of 150° to 180° C. and pressures of 10 to 20 bar. Typically ethylene gas is injected into a liquid stream composed of or containing propylene and/or 1-butene (e.g., in propane or butane). This stream is heated, before or after, the addition of ethylene, to near boiling, and introduced into a fixed bed or packed column reactor containing the supported catalyst. The catalyst is one selected for having a low polymerization to metathesis hydridization of the transition metal reactivity ratio. For example, the supported catalyst can be prepared according to Example 5 below but where 1,1-dimethyl-silyl-bridged bis (4,5,6,7-tetra-hydroindenyl) zirconium dimethyl is used as the transition metal compound. The effluent stream containing ethylene-butene or ethylene-propylene copolymer having low molecular weight (number average molecular weight ($M_n$) below 10,000) and terminal vinylidene unsaturation can then be stripped of solvent by nitrogen purging.

The resulting copolymer can then be derivatized by melt processing with, for example, pulverized maleic anhydride in a stirred tank elevated to a temperature of 220° C. Termination can be by cooling to 60° C. The resulting liquid product is stripped of unreacted maleic anhydride. Immidization as a subsequent reaction of the reaction product can be conducted in mineral oil solution of the reaction product above plus a polyamine such as tetraethylene pentamine. The resulting nitrogen containing, low molecular weight, oil soluble reaction product is suitable in lubricating oil compositions as a dispersant. See the disclosures of co-pending applications U.S. Ser. Nos. 07/992,192 and 07/992,690, filed Dec. 17, 1992, and documents listed therein for further information as to low molecular weight alpha-olefin polymers and appropriate catalysts. Each is incorporated by reference for purposes of U.S. patent practice.

In a similar manner, but utilizing a catalyst suitable for the production of higher molecular weight ($10,000<M_n<300,000$) alpha-olefin/diolefin copolymer having a crystallinity low enough to permit of off solubility (e.g., <40% crystallinity), multifunctional viscosity modifying lubricating oil additives can be produced. See the descriptions of lubricating oil modifiers and lubricating oil compositions in U.S. Pat. Nos. 4,749,505, 4,772,406 and WO-A-93/12148, all incorporated by reference for purposes of U.S. patent practice. Suitable transition metal catalysts are exemplified by one or more of bis(cyclopentadienyl) hafnium dimethyl, bis (tetrahydroindenyl) hafnium dimethyl, ethylene-his (tetrahydroindenyl) hafnium dimethyl and dimethylsilanylene-bis (tetrahydroindenyl) hafnium dimethyl, bis (tetrahydroindenyl) zirconium dimethyl, ethylene-bis (tetrahydroindenyl) zirconium dimethyl and dimethylsilanylene-bis (tetrahydroindenyl) zirconium dimethyl supported in accordance with Example 1 below. See U.S. Pat. Nos. 5,001,205 and 5,198,401, above.

The supported ionic catalyst compositions of the invention can be used as described above individually for coordination or carbocationic polymerization or can be mixed to prepare polymer blends. By selection of monomers, blends of coordination polymers and blends of carbocationic polymers, or the two together, can be prepared under polymerization conditions analogous to those using individual catalyst compositions. Polymers having increased MWD for improved processing and other traditional benefits available from polymers made with mixed catalyst systems can thus be achieved.

The silica supported anionic activator forming the intermediate species of the invention prior to addition of the transition metal compounds can additionally be used to improve the catalyst properties of other known discrete catalyst cations. Examples include: hydrogenation catalysts based on Group 9 metals such as rhodium, e.g., [Rh(diene)(PPh$_3$)$_2$]$^+$ and [Rh(diphos)]$^+$; olefin dimerization catalysts such as those based on nickel, e.g., [Ni(L)$_4$H]$^+$; methacrylate dimerization catalysts such as those based on rhodium metallocenes, e.g., [CpRh(L)(alkyl)]$^+$; and, late transition metal olefin polymerization catalysts such as cobalt metallocenes, e.g., [CpCo(L)(alkyl)]$^+$. In the foregoing standard chemical symbols are used with certain substituent abbreviations: Ph is phenyl, L is a covalent ligand and Cp is cyclopentadiene. A preferred method of using entails reacting the Lewis acid (LA) with a fixed bed or ion exchange column having immobilized silica and then introducing a salt of the discrete catalyst cation in solution for ion exchange reaction with the immobilized reaction product. The fixed bed or ion exchange column is then available for the introduction of monomeric reactants in a reaction medium suitable for the reaction being conducted. See, e.g., "Comparison of Migratory Aptitudes of Hydrides and Alkyl Groups in $\beta$-Migration Insertion Reactions of Cp* (P(OMe)$_3$ Rh(C$_2$H$_4$)R+ (R=—H, —CH$_2$CH$_3$)", M. Brookhart and D. M. Lincoln, *J. Am. Chem. Soc.*, 110, 8719–8720 (1988).

The following examples are presented to illustrate the foregoing discussion. Examples 4, 6, 8, 13, 15, and 16 (polymerization) results are the average of three separate but equivalent runs. All parts, proportions and percentages are by weight unless otherwise indicated. Although the examples may be directed to certain embodiments of the present invention, they are not to be viewed as limiting the invention in any specific respect. In these examples certain abbreviations are used to facilitate the description. These include: Me=methyl, Et=ethyl, Bu=butyl, Ph=phenyl, Cp=cyclopentadienyl, Cp*=pentamethyl cydopentadienyl, Ind=indenyl, Ti=titanium, Hf=hafnium, Zr=zirconium, and Si=silicon. "Davison 948, calcined at 800° C." represents the commercial silica support product of Grace Davison, Inc., which has been calcined at 800° C. under a dry N$_2$ flow for 8–24 hours, so as to achieve a hydroxyl content of 0.2–0.5 mmol/g silica.

EXAMPLE 1

Catalyst A Preparation 2.002 grams of silica (Davison 948, calcined at 800° C.) was slurried in 150 mL of dry toluene at 25° C. under nitrogen in a 500 mL round bottom flask while stirring with a magnetic stirrer, followed by the addition of 0.513 g of trisperfluorophenylboron (LA) was added (as a solid) in small portions. The reaction was stirred for 30 min, and then the supported activator was isolated by vacuum filtration and washed with three 50 mL portions of dry toluene, and dried briefly in vacuo. The supported activator was then reslurried in toluene (150 mL) and 0.323 g of cyclopentadienyl (pentamethylcydopentadienyl) zirconium dimethyl was added as a solid to give a colorless slurry. Stirring was continued for 30 rain and then the supported catalyst was isolated via filtration and washed with three 50 mL portions of toluene. The catalyst was then dried overnight in vacuo, yielding 1.89 g of finished catalyst, with a loading of 0.53 mmol of transition metal per gram of finished catalyst.

EXAMPLE 2

Slurry-Phase Ethylene Polymerization

Polymerization is performed in the slurry-phase in a 1-liter autoclave reactor equipped with a mechanical stirrer, an external water jacket for temperature control, a septum inlet and a regulated supply of dry nitrogen and ethylene. The reactor is dried and degassed thoroughly at 115° C. Hexane (400 cc) is added as a diluent, 0.2 cc of a 25 weight percent triethyl aluminum solution in heptane is added as a scavenger, using a gas tight syringe. The reactor is charged with 75 psig (5.17 bar) of ethylene at 60° C. A 10 cc stainless steel bomb is charged with 0.2 g of Catalyst A and affixed to the reactor with a swagelock fitting. The catalyst is then introduced into the reactor. The polymerization is continued for 30 minutes while maintaining the reaction vessel at 60° C. and 75 psig (5.17 bar) by constant ethylene flow. The reaction is stopped by rapid cooling and venting. The polymer is then recovered. Specific polymerization activity is calculated as done for Example 4.

EXAMPLE 3

Catalyst B Preparation 50.0 grams of silica (Davison 948, calcined at 800° C.) was slurried in 350 mL of dry toluene at 25° C. under nitrogen in a 1 L round bottom flask while stirring with a magnetic stirrer, and 0.90 mL diethylaniline (LB) was added via syringe. Stirring was continued for 5 minutes, at which time 2.8 g of trisperfluorophenylboron (LA) was added (as a solid) in small portions. The reaction was stirred for 30 min, and then the supported activator was isolated by vacuum filtration and washed with three 100 mL portions of dry toluene. The supported activator was then reslurried in toluene (350 mL) and 2.38 g of cyclopentadienyl (1,3-butylmethylcyclopentadienyl)zirconium dimethyl was added as a toluene solution (ca. 10 mL toluene). Gas evolution was observed within 30 seconds of addition and the reaction became light yellow. Stirring was continued for 45 min and then the supported catalyst was isolated via filtration and washed with three 100 mL portions of toluene. The catalyst was then dried overnight in vacuo, yielding 54.3 g of finished catalyst, with a loading of 0.11 mmol of transition metal per gram of finished catalyst.

EXAMPLE 4

Slurry-Phase Ethylene-Hexene Polymerization

Polymerization was performed in the slurry-phase in a 1-liter autoclave reactor equipped with a mechanical stirrer, an external water jacket for temperature control, a septum inlet and a regulated supply of dry nitrogen and ethylene. The reactor was dried and degassed thoroughly at 115° C. Hexane (400 cc) was added as a diluent, 0.2 cc of a 25 weight percent triethyl aluminum solution in heptane was added as a scavenger, using a gas tight syringe, and 50 mL of hexene via cannula. The reactor was charged with 75 psig (5.17 bar) of ethylene at 60° C. A 10 cc stainless steel bomb was charged with 0.2 g of Catalyst B and affixed to the reactor with a swagelock fitting. The catalyst was then introduced into the reactor. The polymerization was continued for 30 minutes while maintaining the reaction vessel at 60° C. and 75 psig (5.17 bar) by constant ethylene flow. The reaction was stopped by rapid cooling and venting. 17.0 grams of ethylene-hexene copolymer were recovered. The polyethylene had a weight average molecular weight of 131,500, a number average molecular weight of 53,000, a molecular weight distribution of 2.5, and contained 7.5% hexene by weight. Specific polymerization activity was calculated by dividing the yield of polymer by the total weight of transition metal contained in the catalyst by the time in hours and by the absolute monomer pressure in atmospheres. For Example 4, the specific activity was calculated as follows, $$\text{specific activity} = \frac{17.0 \text{ grams PE}}{.00198 \text{ g Zr} \times 0.50 \text{ h} \times 5.10 \text{ atm}}$$

$$= 3370 \text{ g PE/g Zr} - \text{h} - \text{atm}$$

$$= 307 \text{ g PE/mmol Zr} - \text{h} - \text{atm}.$$

This example demonstrated the incorporation of 1-hexene to prepare linear low density polyethylene (LLDPE).

EXAMPLE 5

Catalyst C Preparation 0.640 g of trisperfluorophenylboron was dissolved in 8.0 mL toluene, and 0.20 mL of diethylaniline was added with stirring to give a pink solution. This solution was added dropwise to the a slurry of 1.00 g of silica (Davison 948, calcined at 180° C. in vacuo for 16 h) in 30 mL of dry toluene at 25° C. under nitrogen in a 100 mL round bottom flask while stirring with a magnetic stirrer, until the pink color clearly persisted (6.0 mL). The solution was filtered to give a pink filtrate and white solid (supported activator). The supported activator was then reslurried in toluene (10 mL) and 0.236 g of dimethylzixconocene was added as a solid. Gas evolution was observed and the reaction became yellow. After stirring for 15 min the supported catalyst was isolated via filtration and washed with three 5 mL portions of toluene. The catalyst was then dried for 1 h in vacuo, yielding 1.25 g of finished catalyst, with a loading of 0.76 mmol of transition metal per gram of finished catalyst.

This example demonstrated that silicas of high hydroxyl concentration could be used to prepare active polymerization catalysts, and demonstrated as well an alternate preparation method in which the hydroxyl groups were "titrated" with the (pink colored) Lewis acid base complex PhEt$_2$N:B (C$_6$F$_5$)$_3$ to optimize loadings.

EXAMPLE 6

Slurry-Phase Ethylene Polymerization using Catalyst C

The polymerizations were conducted as per Example 2. The polymerization data is summarized in Table 1. This example demonstrated the preparation of high density polyethylene (HDPE) with the invention catalyst.

EXAMPLE 7

Catalyst D Preparation

This catalyst was prepared according to the method of Example 3, except that Me$_2$Si(Ind)$_2$HfMe$_2$ was substituted for (1,3-BuMeCp)$_2$ZrMe$_2$ and the following amounts of each reagent were used, with solvent amounts scaled accordingly: 5.00 grams of silica (Davison 948, calcined at 800° C.); 0.40 mL diethylaniline; 1.28 g of trisperfluorophenylboron; and 1.09 g of Me$_2$Si(Ind)$_2$HfMe$_2$ to yield a loading of 0.28 mmol of transition metal per gram of finished catalyst. This example demonstrated the protonation of the less reactive (relative to Zr) Hf-Me bond to give an active invention catalyst.

EXAMPLE 8

Slurry-Phase Ethylene-Hexene Polymerization using Catalyst D

The polymerizations were conducted as per Example 4, except that 45 mL hexene was used. The polymerization data is summarized in Table 1. This example demonstrated the use of a bridged metallocene to prepare very low density copolymer (VLDPE) (high hexene incorporation).

EXAMPLE 9

Bulk-Phase Propylene Polymerization using Catalyst D

Polymerization was performed in the slurry-phase in a 1-liter autoclave reactor equipped with a mechanical stirrer, an external water jacket for temperature control, a septum inlet and a regulated supply of dry nitrogen and propylene. The reactor was dried and degassed thoroughly at 115° C. Propylene (400 mL) was added along with 0.2 cc of a 25 weight percent triethyl aluminum solution in heptane was added as a scavenger, using a gas tight syringe. The catalyst was then introduced into the reactor as a toluene slurry (10 mg/mL). Initially 3 mL was introduced, and after 15 min an additional 2 mL was introduced. The polymerization was continued for 45 minutes while maintaining the reaction vessel at 60° C. The reaction was stopped by rapid cooling and venting. The polymerization data is summarized in Table 1. Specific polymerization activity is calculated by dividing the yield of polymer by the total mmol of transition metal contained in the catalyst and by the time in hours. This example demonstrate the use of a chiral bridged metallocene to prepare isotactic polypropylene (i-PP).

EXAMPLE 10

Catalyst E Preparation

This catalyst was prepared according to the method of Example 3, except that $Me_5CpTiMe_3$ was substituted for $(1,3-BuMeCp)_2ZrMe_2$ and the following amounts of each reagent were used, with solvent amounts scaled accordingly: 1.00 grams of silica (Davison 948, calcined at 800° C.); 0.018 mL diethylsniline; 0.58 g of trisperfluorophenylboron; and 0.026 g of $Me_5CpTiMe_3$ to yield a loading of 0.10 mmol of transition metal per gram of finished catalyst. This example demonstrated the preparation of a monocyclopentadienyl titanium compound.

EXAMPLE 11

Slurry-Phase Ethylene Polymerization using Catalyst E

The polymerizations were conducted as per Example 2. The polymerization data is summarized in Table 1.

EXAMPLE 12

Catalyst F Preparation

This catalyst was prepared according to the method of Example 3, except that $CpCp^*ZrMe_2$ was substituted for $(1,3-BuMeCp)_2ZrMe_2$ and the following amounts of each reagent were used, with solvent amounts scaled accordingly: 1.00 grams of silica (Davison 948, calcined at 800° C.); 0.080 mL diethylaniline; 0.256 g of trisperfluorophenylboron; and 0.161 g of $CpCp^*ZrMe_2$ to yield a loading of 0.34 mmol of transition metal per gram of finished catalyst.

EXAMPLE 13

Slurry-Phase Ethylene Polymerization using Catalyst F

The polymerizations were conducted as per Example 2. The polymerization data is summarized in Table 1.

EXAMPLE 14

Catalyst G Preparation

This catalyst was prepared according to the method of Example 12, except that the following amounts of each reagent were used, with solvent amounts scaled accordingly: 1.00 grams of silica (Davison 948, calcined at 800° C.); 0.016 mL diethylaniline; 0.051 g of trisperfluorophenylboron; and 0.032 g of $CpCp^*ZrMe_2$ to yield a loading of 0.09 mmol of transition metal per gram of finished catalyst.

EXAMPLE 15

Slurry-Phase Ethylene Polymerization using Catalyst G

The polymerizations were conducted as per Example 2. The polymerization data is summarized in Table 1. Examples 12–15 demonstrate that it is the hydroxyl content of the metal oxide support rather than the amounts of LA and LB which determines the maximum loading of supported activator (and hence the ionic catalyst). Addition of excess (relative to the total hydroxyl group concentration) Lewis acid, secondary proton acceptor, and transition metal compound in Catalyst F (Example 12) did not appreciably increase polymerization activity of F (Example 13) vs. G (Example 15), which had stoichiometric loadings of LA and LB relative to the calculated hydroxyl group concentrations for the silica used to prepare both G and F, as expected for the invention.

EXAMPLE 16

Catalyst H Preparation

This catalyst was prepared according to the method of Example 3, except that $(Me_4Cp)_2HfMe_2$ was substituted for $(1,3-BuMeCp)_2ZrMe_2$ and the following amounts of each reagent were used, with solvent amounts scaled accordingly: 5.00 grams of silica (Davison 948, calcined at 800° C.); 0.393 g tributylamine (LB); 1.075 g of trisperfluorophenylboron; and 0.542 g of $(Me_4Cp)_2HfMe_2$ to yield a loading of 0.2 mmol of transition metal per gram of finished catalyst.

EXAMPLE 17

Slurry-Phase Ethylene-Hexene Polymerization using Catalyst H

The polymerizations were conducted as per Example 4, except that 45 mL hexene was used. The polymerization data is summarized in Table 1, and demonstrate that alkyl amines lead to catalysts at least as active as those prepared with substituted anilines, thus demonstrating that protonation still occurs using the less acidic (relative to diethylaniline) tributylammonium salt of the chemically bound activator anion to give an active invention catalyst.

TABLE 1

| Ex # | Metallocene | Polymer | Catalyst Amt (g) | Polymer yield (g) | Specific Activity | GPC Mw | MWD | Hexene wt % |
|---|---|---|---|---|---|---|---|---|
| 4 | (1,3-BuMeCP)$_2$ZrMe$_2$ | LLDPE | 0.200 | 17.0 | 85 | 131K | 2.49 | 7.5% |
| 6 | Cp$_2$ZrMe$_2$ | HDPE | 0.200 | 18.2 | 201 | 228K | 2.6 | n/a |
| 8 | Me$_2$Si(Ind)$_2$HfMe$_2$ | VLDPE | 0.200 | 44.5 | 312 | 142K | 4.2 | 45% |
| 9 | Me$_2$SI(Ind)$_2$HfMe$_2$ | i-PP | 0.050 | 20.4 | 2900 | 269K | 3.3 | n/a |
| 11 | Me$_5$CpTiMe$_3$ | HDPE | 0.385 | 11.7 | 119 | — | — | n/a |
| 13 | Cp(Me$_5$Cp)ZrMe$_2$ | HDPE | 0.030 | 20.2 | 785 | 261K | 2.9 | n/a |
| 15 | Cp(Me$_5$Cp)ZrMe$_2$ | HDPE | 0.200 | 31.6 | 675 | 282K | 3.1 | n/a |
| 17 | (Me$_4$Cp)$_2$HfMe$_2$ | LLDPE | 0.150 | 38.0 | 585 | 230K | 2.6 | 8.5 |

Comparative Example 18

Non-operative LB & Polymerization Attempt

This catalyst was prepared according to the method of Example 3, except that (Me$_4$Cp)$_2$HfMe$_2$ was substituted for (1,3-BuMeCp)$_2$ZrMe$_2$ and the following amounts of each reagent were used, with solvent amounts scaled accordingly: 5.04 grams of silica (Davison 948, calcined at 800° C.); 0.393 g quinoline (LB); 1.075 g of trisperfluorophenylboron; and 0.542 g of (Me$_4$Cp)$_2$HfMe$_2$ to yield a loading of 0.2 mmol of transition metal per gram of finished catalyst. When polymerizations were conducted as per Example 17, no evidence of ethylene uptake was observed, and no polymer was recovered.

This example demonstrated that amines which are strong Lewis bases are not effective for preparing active invention catalysts.

Comparative Example 19

Non-operative LB & Polymerization Attempt

This catalyst was prepared according to the method of Example 3, except that (Me$_4$Cp)$_2$HfMe$_2$ was substituted for (1,3-BuMeCp)$_2$ZrMe$_2$ and the following amounts of each reagent were used, with solvent amounts scaled accordingly: 5.04 grams of silica (Davison 948, calcined at 800° C.); 1.416 g perfluorotributylamine (LB); 1.075 g of trisperfluorophenylboron; and 0.542 g of (Me$_4$Cp)$_2$HfMe$_2$ to yield a loading of 0.2 mmol of transition metal per gram of finished catalyst. When polymerizations were conducted as per Example 17, no evidence of ethylene uptake was observed, and no polymer was recovered. This example demonstrated that amines which are very weak Bronsted bases are not effective for preparing active invention catalysts.

EXAMPLE 20

Catalyst I Preparation 25.01 grams of silica (Davison 948, calcined at 800° C.) was slurried in 400 mL of dry toluene at 25° C. under nitrogen in a 1000 mL round bottom flask while stirring with a magnetic stirrer, followed by the addition of 1.56 g of diethylaniline and 5.38 g of trisperfluorophenylboron. The reaction was stirred for 30 min, and then the supported activator was isolated by vacuum filtration and washed with three 100 mL portions of dry toluene, and dried briefly in vacuo. The supported activator was then reslurried in toluene (400 mL) and 2.71 g of bis(tetramethylcyclopentadienyl)hafnium dimethyl was added as a solid to give a yellow-orange slurry which darkened to orange red over one hr. Stirring was then discontinued and the supported catalyst was isolated via filtration and washed with four 100 mL portions of toluene, followed by one 100 mL portion of pentane. The catalyst was then dried for 12 h in vacuo, to yield 31.16 g finished catalyst.

EXAMPLE 21

Catalyst J Preparation 25,009 grams of silica (Davison 948, calcined at 800° C.) was slurried in 400 mL of dry toluene at 25° C. under nitrogen in a 1000 mL round bottom flask while stirring with a magnetic stirrer, followed by the addition of 1.58 g of diethylaniline and 5.38 g of trisperfluorophenylboron. The reaction was stirred for 30 min, and then the supported activator was isolated by vacuum filtration and washed with three 100 mL portions of dry toluene, and dried briefly in vacuo. The supported activator was then reslurried in toluene (400 mL) and 3.59 g of bis(tetramethylcyclopentadienyl)hafnium dimethyl was added as a solid to give a yellow-orange slurry which darkened to orange red over 70 min. Stirring was then discontinued and the supported catalyst was isolated via filtration and washed with four 100 mL portions of toluene, followed by one 100 mL portion of pentane. The catalyst was then dried for 2.5 h in vacuo, and slurried in 350 mL pentane. To the slurry was added 4.55 g polyparamethylstyrene (Mw=Mn=2000) ("PMS") in 250 mL pentane, after which the pentane was removed in vacuo using a rotary evaporater (as opposed to stirring), to yield 35.02 g finished catalyst, the finished catalyst having been coated with the polyparamethylstyrene.

EXAMPLE 22

Catalyst K Preparation

This Catalyst was prepared identically to catalyst J except that the following amounts were used: Silica, 25.03 g; diethylaniline, 1.58 g; tris(perfluorphenylboron), 5.37 g; bis(tetramethylcyclopentadienyl)hafnium dimethyl, 2.71 g; poly(paramethylstyrene), 4.5 g. 35.0 g of finished, coated catalyst was obtained.

Gas Phase Polymerization Examples

A sample each of supported catalysts I, J and K described above was used for ethylene/1-hexene copolymerization studies as described below. A continuous fluid bed gas-phase reactor operated at 300 psig (20.7 bar) total pressure, 145° F. (62.8° C.) reactor temperature and 0.7 ft/s (21 cm/s) cycle gas velocity was used for determining catalyst efficiency, ability to incorporate and molecular weight capability co-monomer such as 1-hexene. A solution of triethyl aluminum (1 wt. % in isopentane) was fed into the reactor as a scavenger at a rate of 1 cm³/h. A summary of the process data is included in Table 2. After at least three bed turnovers polymer samples were collected and analyzed.

TABLE 2

| Cat prep Example | I | J | K |
|---|---|---|---|
| inert coating agent | none | poly(PMS) | poly(PMS) |
| mmol TM¹ catalyst | .173 | .154 | .199 |
| wt % Hf | 3.09 | 2.74 | 3.54 |
| PROCESS DATA | | | |
| $H_2$ conc. (ppm) | 53 | 60 | 82 |
| $C_6/C_4$ conc.(mol %) | 0.62 | 0.64 | 0.40 |
| $C_2$ conc.(mol %) | 39.8 | 40.2 | 25.4 |
| $H_2/C_2$ Ratio (× 10⁴) | 1.3 | 1.5 | 3.6 |
| $C_6/C_2$ Ratio | 0.016 | 0.016 | 0.016 |
| Reactor Temp(°F./°C.) | 146/63.3 | 145/62.8 | 145/62.8 |
| Avg. Bed weight (g) | 438 | 440 | 430 |
| Production (g/h) | 145 | 153 | 171 |
| Residence Time (h) | 3.0 | 2.9 | 2.5 |
| Productivity · (g/g) - MB² | 763 | 1021 | 2084 |
| Productivity · (g/g) - XRF³ | 771 | 815 | 1483 |
| NCE⁴ (g/g × h × atm)MB² | 31 | 43 | 160 |
| NCE⁴ (g/g × h × atm) XRF³ | 31 | 35 | 114 |
| NCE⁴ (g/mmol TM × hr × atm) XRF³ | 5.4 | 5.4 | 22.7 |
| Total Bed Turnovers | 4.1 | 5.2 | 7.6 |
| POLYMER DATA | | | |
| MI (ASTM D 1238) | 1.06 | 1.27 | 9.97 |
| density (g/cm) | .9189 | 0.9148 | 0.9164 |

¹TM = Transition Metal
²MB = Material Balance
³XRF = X-Ray Fluoresence
⁴NCE = Normalized Catalyst Efficiency

EXAMPLE 23

Alternative Preparation Method

The chemical reaction equations (2), (3), (3a), and (4) above are essentially quantitative as written (i.e., the reagents result essentially in the reaction product species indicated) as determined by ¹¹B solid state Magic Angle Spinning NMR (vide supra). For comparison, the following alternative preparation method was conducted.

Initially 0.153 g of trisperfluorophenylboron, 0.175 g diethylaniline, and 0.322 g CpCp*ZrMe₂ were dissolved together in toluene, and then added to a slurry of 3.01 grams of silica (Davison 948, calcined at 800° C.) in 200 mL of dry toluene at 25° C. under nitrogen in a 500 mL round bottom flask while stirring with a magnetic stirrer. The reaction was stirred for 30 min, and then the supported activator was isolated by vacuum filtration and washed with three 50 mL portions of dry toluene. The catalyst was then dried overnight in vacuo, yielding 3.47 g of finished catalyst, with a loading of 0.29 mmol of transition metal per gram of finished catalyst. This material was evaluated by NMR as described above, and determined to contain a mixture of boron containing species.

The polymerizations were conducted as per Example 4. The specific activity was calculated to be 130 g PE/mmol Zr-h-atm. The polymer had a weight average molecular weight of 69,600, a number average molecular weight of 7300, a molecular weight distribution (MWD) of 9.5, and contained 8.0% hexene by weight.

The low $M_W$ and broad MWD suggest that the polymerization activity observed is not due solely to the single catalytically active species of the invention. The polymerization activity likely is due in part to the pressure of other catalytically active species anticipated to result from this process of preparation. The formation of active ionic catalyst [CpCp*ZrMe]⁺ [Me(pfp)₃B]⁻ by reaction of CpCp*ZrMe₂ with trisperfluorophenyl boron is well known. Furthermore, it is expected that this species will not be readily removed from silica even after washing with large volumes of an aromatic solvent due to interactions with polar functionality of the support. The formation of chemically bound transition metal species via reaction of CpCp*ZrMe₂ with the hydroxyl groups on silica to liberate methane is also known.

EXAMPLE 24

Comparative Example and NMR spectroscopy

The comparison catalyst was prepared according to the procedure described in Example 14 of WO 91/09882, with 5.0 g of triethylaluminum-treated silica, 0.160 g N,N-dimethylanilium tetrakis(pentafluorophenyl)boron, and 0.080 g Cp₂HfMe₂ being used, and solvent amounts increased by the same percentage. The invention catalyst was prepared as per example 1 below, except that 5.00 g of silica, 0.179 g of diethylaniline, 0.614 g of trisperfluorophenylboron and 0.406 g of Cp₂HfMe₂ were used with solvent amounts increased by the same percentage. High-speed Magic Angle Spinning ¹¹B NMR spectroscopy was carried out on a Bruker MSL-400 spectrometer tuned to 128.39 MHz. Samples were loaded under a nitrogen atmosphere into 5 or 7 mm o.d. air-tight cylindrical zirconia rotors and spun at speeds of 5–8 kHz. Spectra were acquired using one-pulse excitation. All spectra had a line broadening factor of 25 Hz applied to increase S/N ratio. All ¹¹B chemical shifts were determined relative to the highest-shielding resonance of borax, Na₂B₄O₇.10H₂O, for which the chemical shift is 2.0 ppm relative to Et₂O.BF3, and are reported here relative to Et₂O.BF3.

The following is claimed:

1. A metallocene catalyst composition characterized by comprising a metal oxide support having a counter anion that is derived from a Lewis acid not having readily hydrolyzable ligands and is covalently bound to the surface of the support directly through the oxygen atom of the metal oxide, wherein the anion is also ionically bound to a catalytically active transition metal compound.

2. The composition of claim 1 wherein said metal oxide comprises silica.

3. The composition of claim 1 wherein said anion is non-coordinating toward the transition metal atom of said transition metal compound.

4. The composition of claim 1 wherein said transition metal is at least one selected from the group consisting of Group 4, 5, 6, 9 and 10 metals.

5. The composition of claim 1 wherein said transition metal is one or more of Ti, Zr or Hr.

6. The composition of claim 1 wherein said transition metal compound is a monocyclopentadienyl compound and the metal is titanium.

7. The catalyst composition of claim 1 wherein said anion is an activator anion.

8. The catalyst composition according to claim 1 prepared by the process comprising:
   a) contacting a Lewis acid non-coordinating anion precursor with a hydroxyl group-containing metal or metalloid oxide based support material;
   b) providing a Bronsted base strong enough to abstract a proton from the reaction product of a); and c) providing a transition metal compound capable of catalytic activation via protonation by the reaction product of b).

9. The composition of claim 8 wherein the precursor of a) is a neutral compound comprising a Group 13 metal or metalloid center with a complement of ligands sufficiently electron-withdrawing that the Lewis acidity is greater than or equal to that of $AlCl_3$.

10. The composition of claim 8 wherein the Bronsted base composition of b) is one or more selected from the group consisting of dimethylaniline, diethylaniline, diphenylmethylamine, and tributylamine.

11. The composition of claim 8 wherein the transition metal compound is a mono- or biscyclopentadienyl substituted Group 4, 5, 6, 9, or 10 transition metal compound which may optionally contain essentially hydrocarbyl substitutents on at least one cyclopentadienyl substituent and which may optionally be bridged.

12. The composition of claim 11 wherein said transition metal compound comprises a Group 4–6 metal.

13. The composition of claim 11 wherein said transition metal compound is a monocyclopentadienyl compound and the transition metal is titanium.

14. The composition of claim 11 wherein said transition metal compound is a biscyclopentadienyl compound and the transition metal is zirconium or hafnium.

15. The composition of claim 1 wherein the counter anion comprises a boron atom.

16. A polymerization process characterized by comprising contacting one or more monomers polymerizable by coordination polymerization under suitable polymerization conditions with a metallocene catalyst composition comprising a metal oxide support having a counter anion that is derived from a Lewis acid not having readily hydrolyzable ligands and is covalently bound to the surface of the support directly through the oxygen atom of the metal oxide, wherein the anion is also ionically bound to a catalytically active transition metal compound.

17. The process of claim 16 wherein said contacting is accomplished in the presence of a liquid diluent under slurry polymerization conditions.

18. The process of claim 16 wherein said contacting is accomplished in a gas phase reactor under conditions of gas phase polymerization.

19. The process of claim 16 wherein said monomers comprise at least one member of the group consisting of alpha-olefins, non-conjugated diolefins, acetylenically unsaturated monomers, olefinically unsaturated aromatic monomers, and $C_{20}$–$C_{100}$ macromonomers.

20. The process of claim 16 wherein said monomers comprise at last one member of the group consisting of ethylene and $C_2$–$C_{20}$ alpha-olefins.

21. The process of claim 16 wherein said monomers comprise propylene.

* * * * *

UNITED STATES PATENT AND TRADEMARK OFFICE
CERTIFICATE OF CORRECTION

PATENT NO. : 5,643,847
DATED : July 1, 1997
INVENTOR(S) : John F. Walzer, Jr.

It is certified that error appears in the above-identified patent and that said Letters Patent is hereby corrected as shown below:

Abstract Column, Lines 9 & 10: "trisperflourophenyl" should read "trisperfluorophenyl"

Column 14, Line 25: "dimethylzixconocene" should read "dimethylzirconocene"

Column 20, Line 23: "below" should read "above"

Column 20, Line 55: "Hr" should read "Hf"

Signed and Sealed this

Twenty-ninth Day of August, 2000

Attest:

Q. TODD DICKINSON

*Attesting Officer*

*Director of Patents and Trademarks*